United States Patent [19]
Weiss

[11] Patent Number: 5,097,935
[45] Date of Patent: Mar. 24, 1992

[54] APPARATUS FOR INTERMITTENTLY ADVANCING PALLETS

[76] Inventor: Dieter Weiss, Danziger Strasse 6, D-6967 Buchen, Fed. Rep. of Germany

[21] Appl. No.: 602,112

[22] Filed: Oct. 22, 1990

[30] Foreign Application Priority Data

Oct. 25, 1989 [EP] European Pat. Off. ........ 89119808.7

[51] Int. Cl.⁵ ............................................. B65G 15/64
[52] U.S. Cl. .............................. 198/345.3; 198/465.3; 29/33 P
[58] Field of Search ............... 198/345.3, 465.1, 465.3, 198/467.1, 662; 29/33 P

[56] References Cited

U.S. PATENT DOCUMENTS

| | | | |
|---|---|---|---|
| 3,527,087 | 9/1970 | Converse, III et al. | 198/465.3 X |
| 3,934,701 | 1/1976 | Mooney et al. | 198/345.3 |
| 4,502,585 | 3/1985 | Sticht | 198/345.3 |
| 4,561,819 | 12/1985 | Wiernicki | 198/345.3 X |
| 4,674,620 | 6/1987 | Inoue | 198/345.3 |
| 4,687,091 | 8/1987 | Sticht | 198/345.3 |
| 4,917,226 | 4/1990 | Blocker | 198/465.3 X |

FOREIGN PATENT DOCUMENTS

| | | |
|---|---|---|
| 3224330 | 1/1984 | Fed. Rep. of Germany . |
| 2071993 | 9/1971 | France . |
| 2228012 | 11/1974 | France . |

Primary Examiner—Joseph E. Valenza
Assistant Examiner—Tuan N. Nguyen
Attorney, Agent, or Firm—Peter K. Kontler

[57] ABSTRACT

Apparatus for intermittently advancing successive pallets of a series of pallets with downwardly extending roller followers and profiled sidewalls has two endless belt conveyors which are continuously driven to advance the pallets above them along a horizontal path and into the range of an intermittently rotated cylindrical conveyor having an open-ended helical peripheral groove for the followers of successive pallets. The end portions of the groove extend circumferentially of the cylindrical conveyor and are flanked by front and rear stops for the followers of two successive pallets. The sidewalls of the pallet whose follower engages the stop at the front end of the cylindrical conveyor are engaged by idler rollers which maintain the respective pallet above and out of contact with the belt conveyors.

16 Claims, 3 Drawing Sheets

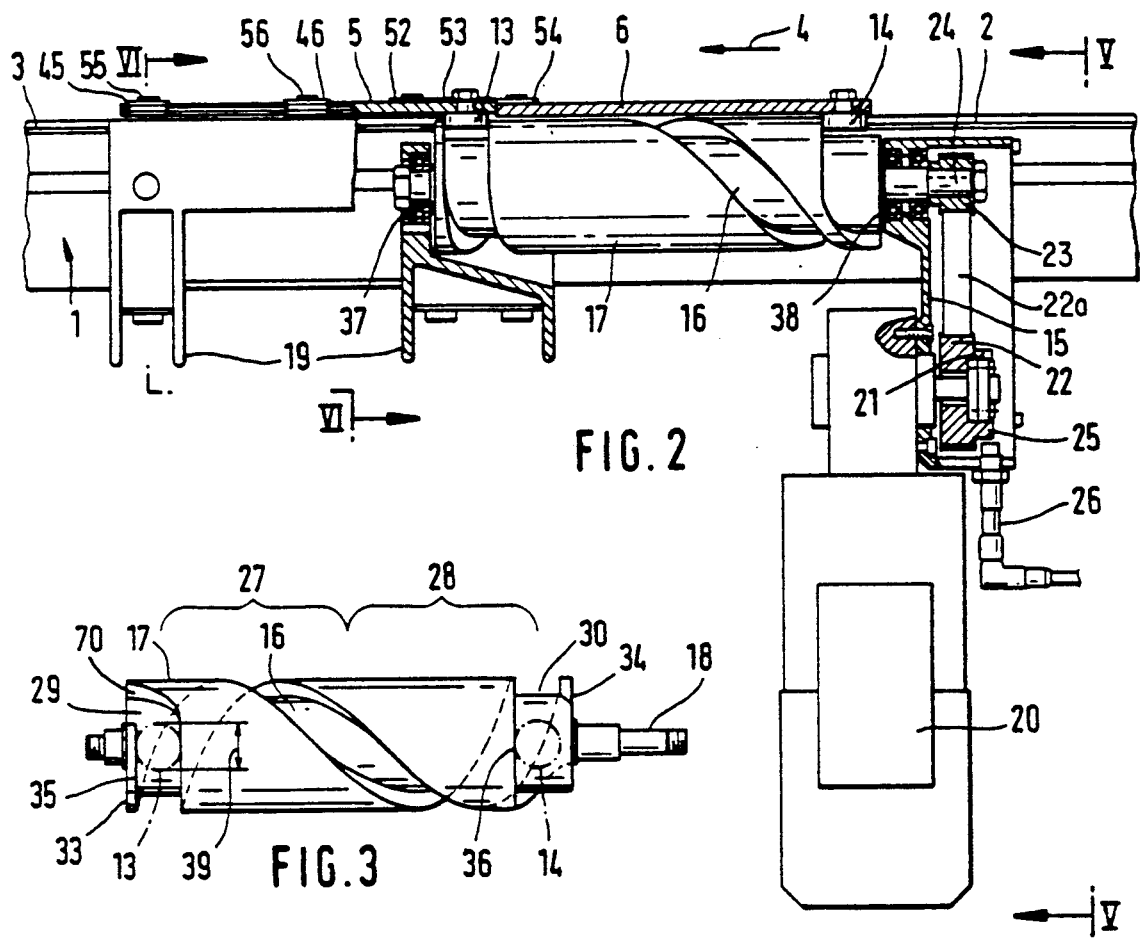
FIG. 2
FIG. 3
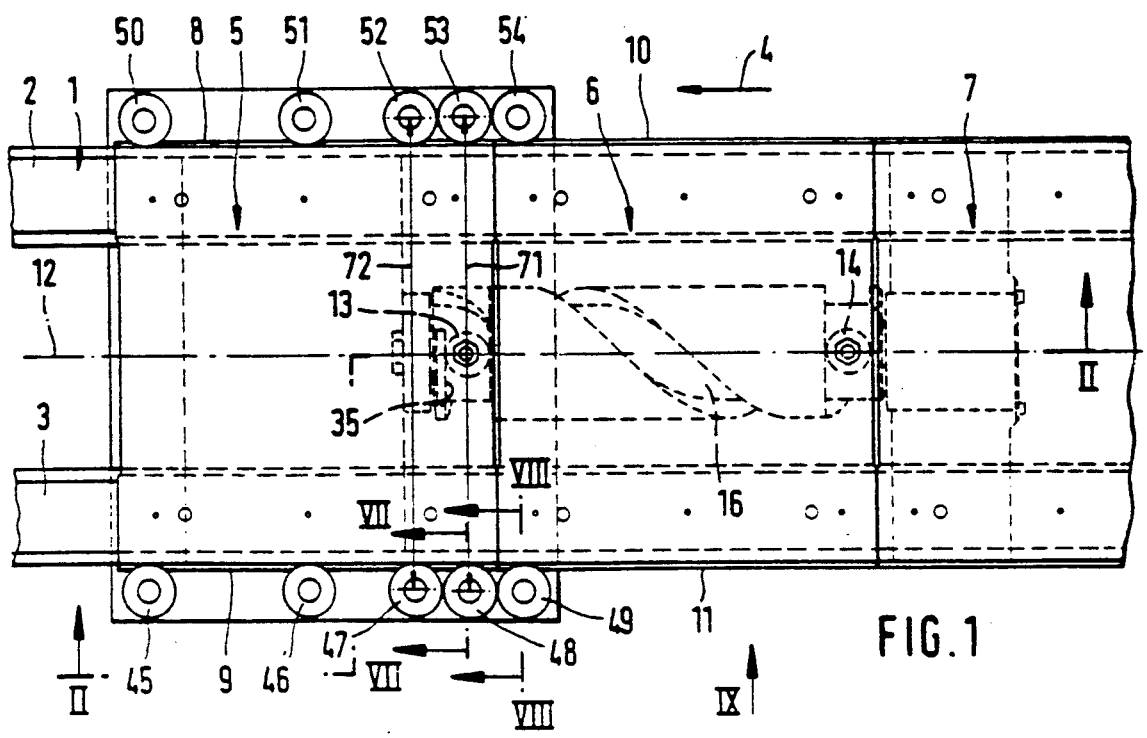
FIG. 1

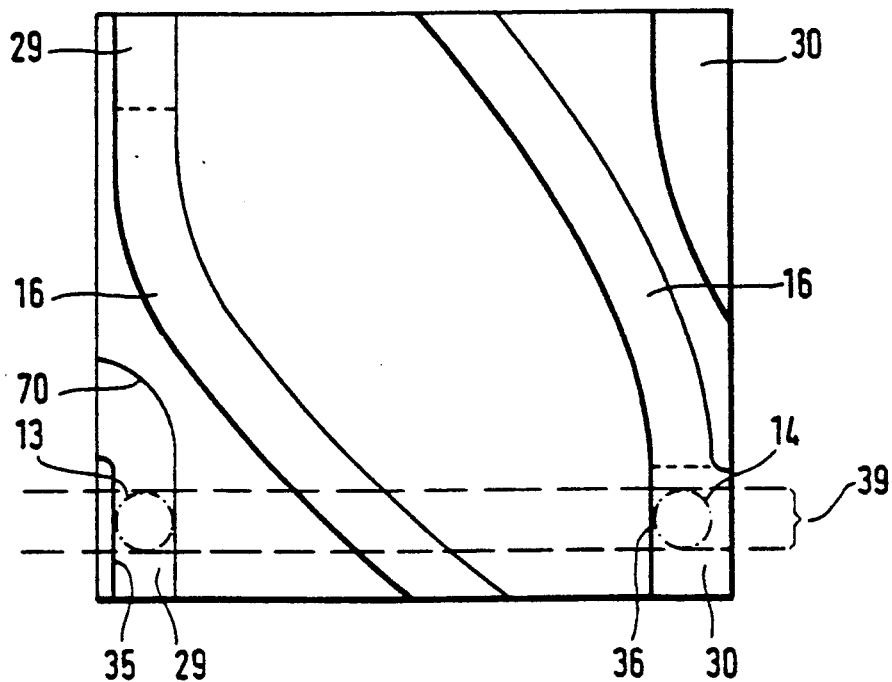
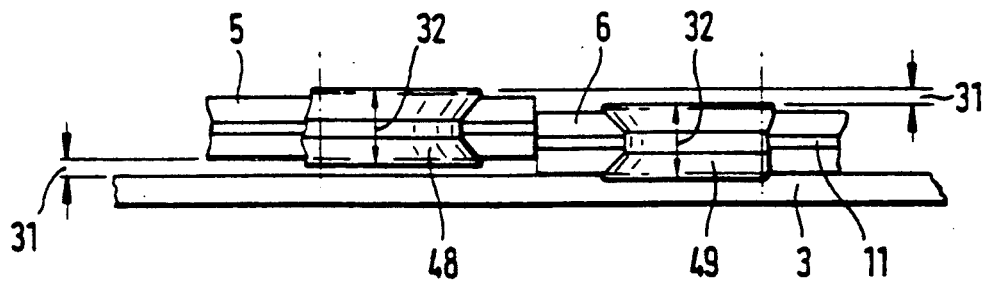
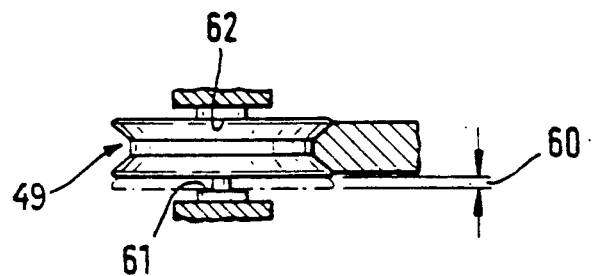

5,097,935

APPARATUS FOR INTERMITTENTLY ADVANCING PALLETS

BACKGROUND OF THE INVENTION

The invention relates to improvements in apparatus for intermittently advancing pallets or other objects. More particularly, the invention relates to improvements in apparatus of the type wherein the objects can be advanced by a rotor which has a circumferential helical groove for followers extending from the objects to be advanced.

Published German patent application No. 32 24 330 of Schollmayer discloses an apparatus wherein successive pallets of a series of pallets are caused to advance on a roller conveyor into the range of an intermittently driven cylindrical conveyor. The cylindrical conveyor is rotatable about an axis which is parallel to the direction of advancement of pallets and its peripheral surface has an open-ended helical groove for downwardly extending followers provided at the undersides of pallets which approach the rear end of the cylindrical conveyor by moving along the roller conveyor. The rollers of the roller conveyor are idler rollers. The rearwardly facing end face of the cylindrical conveyor constitutes a stop for the oncoming foremost pallet. The central section of the helical groove in the peripheral surface of the cylindrical conveyor extends in the circumferential direction of the conveyor, and a surface bounding a portion of the central section and facing counter to the direction of advancement of pallets constitutes a stop for a pallet which is already engaged by the cylindrical conveyor. Special drive means are necessary to set in motion a pallet which was arrested by the second stop. Alternatively, it is necessary to provide a complex synchronizing system which replaces the specially designed drive means. The relatively long cylindrical conveyor contributes to overall length of the apparatus. Moreover, the interval of time which is required to advance a pallet beyond the cylindrical conveyor is relatively long.

Other conventional pallet advancing apparatus are disclosed in French Pat. No. 2.071.993 granted to Giddings & Lewis, Inc. and in French Pat. No. 2.228.012 granted to Ossbahr.

OBJECTS OF THE INVENTION

An object of the invention is to provide an apparatus which can move successive pallets or other objects of a series of successive objects to a predetermined position with little loss in time.

Another object of the invention is to provide an apparatus wherein a relatively short helically grooved rotary conveyor suffices to advance successive objects of the series of objects to a predetermined position.

A further object of the invention is to provide the apparatus with a novel and improved intermittently driven rotary conveyor.

An additional object of the invention is to provide an apparatus wherein the objects are delivered into the range of the intermittently driven conveyor in a novel and improved way.

Still another object of the invention is to provide a novel and improved apparatus for transporting workpieces or other objects or commodities to predetermined positions for treatment in rapid sequence and in such a way that the intervals between deliveries of successive workpieces to a material removing or other processing station are shorter than in heretofore known apparatus.

A further object of the invention is to provide a novel and improved method of manipulating pallets.

Another object of the invention is to provide the apparatus with novel and improved means for accelerating an object which is to leave a preselected position.

An additional object of the invention is to provide novel and improved guide means for objects which are being advanced toward and are held at a material removing or other treating station.

A further object of the invention is to provide an apparatus wherein the objects which are located ahead of or downstream of the processing station are continuously urged to advance in a predetermined direction.

Another object of the invention is to provide an apparatus wherein an object is invariably ready to enter the processing station as soon as the preceding object leaves the station.

SUMMARY OF THE INVENTION

The invention is embodied in an apparatus for intermittently advancing successive objects (such as pallets) of a series of objects each of which is provided with a follower (particularly with a downwardly extending roller follower). The improved apparatus comprises an endless first conveyor which serves to frictionally engage and entrain the objects of the series in a predetermined direction and along a predetermined path, and an intermittently driven second conveyor including a rotor which is rotatable about an axis extending in the predetermined direction and has a peripheral surface provided with an open-ended helical follower-receiving groove. The rotor further comprises a first stop which is engageable by an oncoming object of the series and a second stop which is engageable by an object having a follower in the groove and occupying a predetermined portion of the path, and the apparatus further comprises means for rotating the rotor about its axis. The first conveyor preferably comprises a plurality of parallel endless belt or chain conveyors.

The rotor of the second conveyor has a front end and a rear end (as seen in the predetermined direction). The first stop is disposed at the rear end and the second stop is disposed at the front end of the rotor. One end of the open-ended groove preferably constitutes a first circumferentially extending recess at the rear end of the rotor, and the other end of the groove preferably constitutes a second circumferentially extending groove at the front end of the rotor. The first stop flanks the first recess, the second stop flanks the second recess, and each stop faces counter to the predetermined direction. Each stop preferably extends transversely of the predetermined direction and both stops extend in the circumferential direction of the rotor through substantially identical angles.

The second recess is preferably bounded in part by a cam face serving to accelerate the follower in the second recess in response to starting of the rotor.

The rotating means can comprise a prime mover, a device (e.g., an electric switch) which is operable to arrest the prime mover, and a step-down transmission between the prime mover and the device. If the groove of the rotor has n convolutions, the ratio of the transmission is preferable 1:n. For example, if the groove in the peripheral surface of the rotor has two convolutions, the ratio of the speed of the rotor to the speed of the output element (such as an eccentric cam) of the transmission is two-to-one.

The objects can constitute pallets each of which has two sidewalls in the form of rails which flank the path and have predetermined first profiles. Such apparatus preferably further comprises guide means flanking the path and having second profiles which are complementary to the first profiles. In accordance with one presently preferred embodiment, the guide means comprises idler rollers rotatable about axes extending substantially at right angles to the predetermined direction and at right angles to the axis of rotation of the rotor. The rollers can include a first set of rollers which engage the sidewalls of an object upstream of the predetermined portion of the path while the object is engaged by the first conveyor, and a second set of rollers which engage the sidewalls of an object in the predetermined portion of the path to maintain such object out of contact with the first conveyor. The profiles of the second set of rollers can be offset relative to the profiles of the first set of rollers by a distance of 0.3 to 1.00 mm, preferably approximately 0.8 mm. The rollers of the first set preferably engage the sidewalls between them with an axial play which at least matches the aforementioned distance. To this end, the rollers of the first set can be mounted for limited axial movement relative to the rollers of the second set. The rollers of the second set can include a pair of closely adjacent rollers at each side of the predetermined path, and the rollers of such pairs are adjacent the front end of the rotor (as seen in the predetermined direction). The rollers of the second set can include a first group of rollers which are disposed at a first distance from each other (as seen transversely of the predetermined direction), and a second group of rollers which are disposed at a greater second distance from each other. The second distance can exceed the first distance by 0.05 to 0.3 mm, preferably by 0.1 mm.

The first profiles or the second profiles are or can be substantially roof-shaped profiles. The second profiles can include surfaces which bound wedge-shaped circumferential grooves provided in the peripheral surfaces of the rollers. The rollers can be replaced by stationary (non-rotatable) wedge-like guide elements which are affixed to a frame rotatably mounting one end of the rotor. It is also possible to employ rollers which have peripheral surfaces provided with radially outwardly extending circumferentially complete projections receivable in complementary grooves provided in the sidewalls of the objects.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a fragmentary plan view of an apparatus which embodies one form of the invention, the foremost object being shown in the operative position and the next-following object being shown in a position of readiness immediately behind the foremost object;

FIG. 2 is a partly side elevational and partly vertical sectional view substantially as seen in the direction of arrows from the line II—II in FIG. 1;

FIG. 3 is plan view of the rotor of the second conveyor shown in an angular position which it assumes when an object is maintained in the operative position;

FIG. 4 is a developed view of the second conveyor;

FIG. 9 is an enlarged fragmentary front elevational view substantially as seen in the direction of arrow IX in FIG. 1;

FIG. 10 is a view similar to that of FIG. 7 but showing an axially movable idler roller.

DESCRIPTION OF PREFERRED EMBODIMENTS

Figure 6:
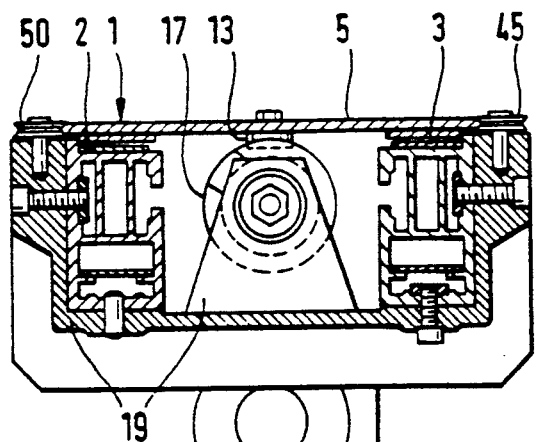
FIG. 6 is a partly elevational and partly transverse vertical sectional view substantially as seen in the direction of arrows from the line VI—VI in FIG. 2.
Figure 5:
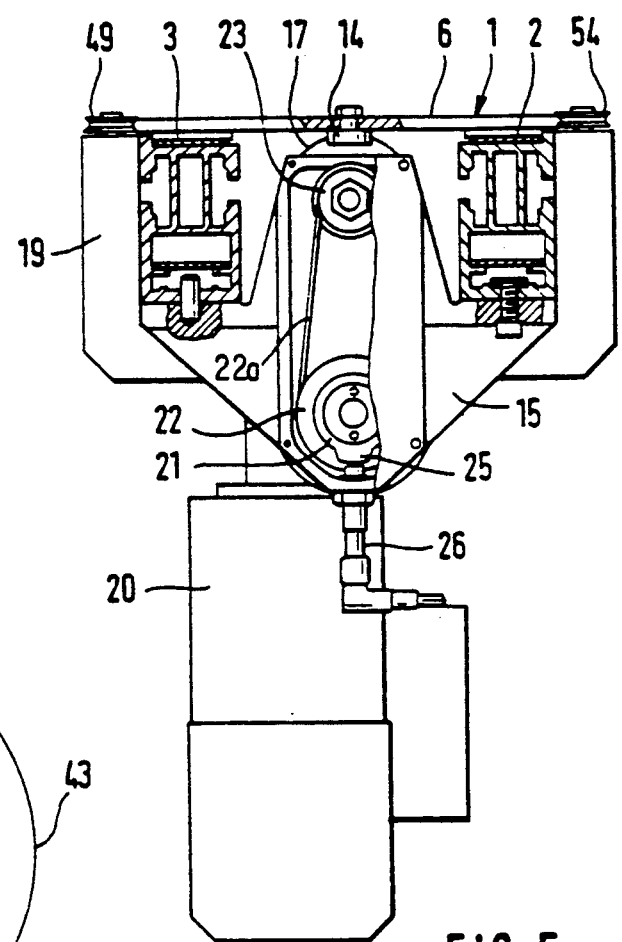
FIG. 5 is a partly elevational and partly transverse vertical sectional view as seen in the direction of arrows from the line V—V in FIG. 2.

FIGS. 1 and 2 show a portion of an apparatus 1 which serves to intermittently advance successive pallets of a series of pallets in a predetermined direction (arrow 4) along a predetermined horizontal path which is defined by the upper reaches of two endless belt conveyors 2, 3 forming part of a continuously driven first conveyor, and by guide means including several sets of guide elements in the form of idler rollers (FIG. 1 shows a total of ten rollers, including rollers 45 to 49 at one side and rollers 50 to 54 at the other side of the path for the pallets). FIG. 1 shows a foremost pallet 5 which is located in a predetermined portion of its path between the two rows of rollers 45–49 and 50–54, a second pallet 6 which is located immediately behind the pallet 5, and a third pallet 7 immediately behind the pallet 6. The path which is defined by the endless belt conveyors 2, 3 of the first conveyor can be and normally is much longer so that it provides room for one or more pallets behind the pallet 7 as well as for one or more pallets in front of the pallet 5. If and when the pallet 5, 6 or 7 is arrested by the cylindrical rotor 17 of a second conveyor, the pallets behind the arrested rotor 17 are pushed against each other and against the arrested rotor so that they form a single file of immediately adjacent abutting pallets. A pallet, the underside of which is directly engaged by the upper reaches of the belt conveyors 2, 3 can be entrained by these conveyors in the direction of arrow 4 and can push one or more preceding pallets in the same direction.

Each of the illustrated pallets 5, 6 and 7 has a stable rigid polygonal (e.g., square or rectangular) panel or platform above the upper reaches of the belt conveyors 2, 3 and two downwardly extending lateral sidewalls in the form of elongated parallel rails. The sidewalls of the pallet 5 are denoted by the characters 8, 9 and the sidewalls of the pallet 6 are denoted by the characters 10, 11. Each sidewall extends the full length of the respective platform, i.e., from the front end face all the way to the rear end face of the respective platform. The rear end portion of each platform carries a centrally located downwardly extending roller follower which is rotatable about a vertical axis, i.e., about an axis which is normal to the direction (arrow 4) of advancement of pallets along their elongated path and is also normal to such path. The follower 13 of the pallet 5 is shown as being located at the front end of the rotor 17, and the follower 14 of the pallet 6 is shown as being located at the rear end of the rotor. The axes of the roller followers 13, 14 are located in a central vertical symmetry plane 12 of the pallets 5 to 7 above the upper reaches of the belt conveyors 2 and 3.

The rotor 17 has a cylindrical peripheral surface which is provided with a helical groove 16 having an open rear end at the rear end 34 and an open front end at the front end 33 of the rotor. The width of the grove 16 is selected with a view to permit entry of the roller followers 13, 14 as well as of similar or identical roller followers at the rear ends of the next-following pallets 7, etc.

The rotor 17 is mounted on or is integral with a centrally located shaft 18 which can receive torque from a prime mover 20 and the axis of which is located in the vertical symmetry plane 12. Thus, the common axis of the shaft 18 and rotor 17 extends in the direction of arrow 4 and is normal to the vertical axes of the idler rollers 45 to 54. The front stub of the shaft 18 is journalled in an antifriction bearing 37 which is mounted in an arresting housing or frame 19, and the rear stub of the shaft 18 is journalled in an antifriction bearing 38 which is mounted in a changer housing or frame 15. The housings or frames 15 and 19 are mounted on longitudinally extending profiled tie rods or carrier rods (not specifically shown) of the apparatus 1.

The drive means for the shaft 18 and rotor 17 comprises the aforementioned prime mover 20 (e.g., an electric or other suitable motor) having an output shaft which is parallel to the shaft 18 and carries a driver pulley 22 for a belt 22a which drives a pulley 23 on the adjacent rearmost portion 24 of the shaft 18 at a ratio of 1:2. The output shaft of the prime mover 20 further carries an eccentric cam 25 which can be integral with the driver pulley 21 and serves to intermittently actuate a switch 26 constituting or forming part of a device which is operable to arrest the prime mover 20 after the rotor 17 completes an angular movement through a predetermined angle. The prime mover 20 is started by a control unit (not shown) of the apparatus 1 and remains in operation until the cam 25 trips the device 26 so that the latter opens the circuit of the prime mover 20 if the latter constitutes an electric motor. The arrangement is such that, when the prime mover 20 is started by the aforementioned control unit of the apparatus 1, the driver pulley 21 completes one full revolution and the rotor 17 completes two full revolutions before the prime mover 20 is arrested by the cam 25 through the medium of the device 26.

FIGS. 1, 2, 3, 4, 6, and 7 show the rotor 17 in a predetermined angular position, namely in that position which the rotor assumes when the prime mover 20 is idle. The helical groove 16 has two complete convolutions (see FIGS. 3 and 4) and the rear and front ends of the groove 16 respectively constitute circumferentially extending recesses 30, 29 which are machined into or are otherwise formed in the peripheral surface of the rotor 17. The recess 30 has an inlet for roller followers 13, 14, etc. in the rear end 34 of the rotor 17, and the recess 29 has an outlet for roller followers in the front end 33 of the rotor 17. A portion of the recess 29 is bounded by a cam face 70 which effects an acceleration of the adjacent roller follower in the direction of arrow 4 when the rotor 17 is started by the prime mover 20. Such cam face propels the trailing end of a pallet beyond the foremost pair of transversely aligned idler rollers 45 and 50.

The rotor 17 has a surface 36 which faces rearwardly and bounds a portion of the recess 30; this surface constitutes a first stop for an adjacent pallet, and the rotor 17 has a second stop 35 which bounds a portion of the recess 29 and also faces counter to the direction which is indicated by the arrow 4. The stop 35 can serve as an abutment for an adjacent roller follower. FIG. 1 shows that the stop 35 is engaged by the roller follower 13 of the front pallet 5 whereby the latter occupies a predetermined portion of the path which is defined by the upper reaches of the belt conveyors 2 and 3. This ensures that the pallet 5 is held in an operative position in which one or more workpieces (not shown) on the pallet 5 are ready to be treated by one or more tools of a machine tool, e.g., one of a series of machine tools which together form a production line and are installed adjacent the path of pallets 5, 6, 7 etc. on the conveyors 2 and 3. At the same time, the roller follower 14 of the pallet 6 immediately behind the pallet 5 abuts the rear stop 36 of the rotor 17 to thus ensure that the pallet 6 is maintained in a position of readiness immediately upstream of that pallet (namely the pallet 5) which is maintained in the operative position by the front stop 35 of the rotor 17. The stops 35, 36 extend substantially circumferentially of the rotor 17 through the same angle 39. The magnitude of the angle 39 is selected with a view to provide a certain tolerance for the eccentric cam 25, i.e., to ensure that the prime mover 20 can be maintained at a standstill even if the rotor 17 is not maintained in a single predetermined angular position. Thus, the cam 25 can maintain the device 26 in open position in any one of several angular positions of the rotor 17 while the roller follower of a pallet engages the stop 35 or 36.

When the rotor 17 is idle in the angular position of FIG. 1, the roller follower 13 engages the front stop 35 and the roller follower 14 engages the rear stop 36 because the respective pallets 5 and 6 are located immediately behind each other. As mentioned above, this ensures that the pallet 5 is held in a predetermined operative position and that the pallet 6 is held in a predetermined position of readiness immediately behind that (predetermined) portion of the path above the conveyors 2, 3 which is occupied by the pallet 5. The pallet 6 is engaged by and is urged forwardly by the upper sides of the upper reaches of the conveyors 2 and 3, i.e., these upper reaches slide relative to the underside of the platform of the pallet 6 because the latter is held against forward movement (in the direction of arrow 4) by the respective (rear) stop 36 as well as by the pallet 5 (the roller follower 13 of which abuts the front stop 35). The pallets (including the pallet 7) which are located behind the pallet 6 are also urged forwardly as a result of frictional engagement with the upper reaches of the belt conveyors 2, 3 and are at a standstill as soon as the gaps (if any) between such pallets are reduced to zero, i.e., as soon as the pallet 7 abuts the pallet 6, the pallet behind the pallet 7 abuts the pallet 7 and so forth.

Figure 7:
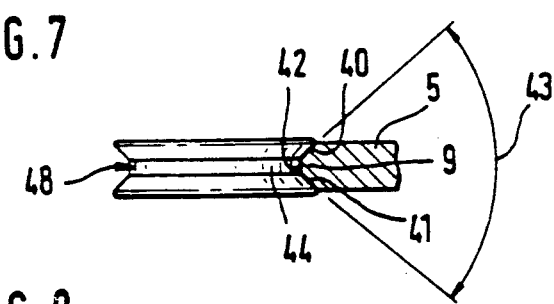
FIG. 7 is an enlarged transverse vertical sectional view of a detail as seen in the direction of arrows from the line VII—VII of FIG. 1.

As can be seen in FIG. 7, the sidewalls or rails of the pallets 5, 6, 7 (FIG. 7 shows the sidewall 9 of the pallet 5) are profiled in such a way that their cross sections resemble wedges, i.e., those portions of the sidewalls which engage the adjacent idler rollers (FIG. 7 shows the idler roller 48) are substantially roof-shaped in that they are bounded by two mutually inclined conical surfaces 40, 41 and a third surface or top land 42 which is parallel to the central symmetry plane 12. The profile of each idler roller is complementary to the profile of the adjacent sidewall 8, 9, 10 or 11. Thus, the peripheral surface of the idler roller 48 which is shown in FIG. 7 has an endless groove 44 which is bounded by two conical surfaces complementary to the surfaces 40, 41 and a third surface complementary to the surface 42 of the adjacent sidewall 9 of the pallet 5. The surfaces 40, 41 make an angle 43 which is preferably somewhat less than 90°, e.g., approximately 87°. These conical surfaces are preferably mirror symmetrical to each other with reference to a horizontal plane which halves the top land 42 and is normal to the symmetry plane 12. The profiled portion of the sidewall 9 is preferably identical with the profiled portion of the sidewall 8, 10 or 11 as well as with the profiled portion of each sidewall of each pallet behind the pallet 6.

The vertical shafts of the idler rollers 45 to 54 are mounted in the front housing or frame 19. FIG. 2 merely shows the shafts 55, 56 of the rollers 45 and 46, respectively. The arrangement is such that each of these vertical shafts is fixedly mounted in the housing or frame 19 so that the position of the respective idler roller is fixed in three different directions, namely as seen in the direction of arrow 4, as seen transversely of the elongated path for the pallets and as seen in the axial direction of these shafts. Antifriction or friction bearings can be installed between the idler rollers 45 to 54 and their respective vertical shafts. The axes of rotation of the idler rollers are normal to the plane of FIG. 1.

FIG. 1 shows that the idler rollers 45 to 48 and 50 to 53 flank the sides of that pallet (5) which is maintained in the operative position in that its roller follower (13) engages the front stop 35 of the rotor 17. The idler rollers of the rearmost set of transversely aligned rollers (namely the rollers 49, 54 of FIG. 1) are mounted at such a level that they permit the underside of the adjacent pallet (6 in FIG. 1) to remain in frictional engagement with the upper reaches of the belt conveyors 2 and 3. In other words, the profiled portions of the sidewalls 10, 11 can engage the surfaces in the circumferential grooves of the idler rollers 49, 54 while the underside of the platform of the pallet 6 rests on the upper reaches of the conveyors 2, 3 which are driven so that they urge the roller follower 14 of the pallet 6 against the rear stop 36 of the rotor 17.

The idler rollers 45 to 48 and 50 to 53 are located at a level above the levels of the idler rollers 49 and 54. The difference 31 (FIG. 9) between the two levels is relatively small but suffices to ensure that the pallet (5 in FIG. 1) the sidewalls (8, 9) of which engage the idler rollers 45 to 48 and 50 to 53 is maintained at a level above and out of contact with the continuously driven belt conveyors 2 and 3. In other words, the pallet (5) which assumes the operative position of abutment of its roller follower (13) with the front stop 35 of the rotor 17 is not urged forwardly by the belt conveyors 2 and 3 but is held in the operative position solely as a result of engagement of its roller follower with the stop 35. The difference 31 is exaggerated in FIG. 9 for the sake of clarity; this difference can be in the range of 0.3 to 1.0 mm, preferably approximately 0.8 mm. All that counts is to select a distance 31 which barely suffices to ensure that the pallet (5) which dwells in the operative position is not in frictional engagement with the upper sides of the upper reaches of the belt conveyors 2 and 3. The axial length 32 (FIG. 9) of an idler roller be in the range of 3 to 10 mm, preferably approximately 7 mm, i.e., the distance 31 can be said to equal or approximate one-tenth of the distance 32.

An advantage of the feature that the idler rollers 45 to 48 and 50 to 53 maintain the pallet 5 out of frictional engagement with the belt conveyors 2 and 3 is that the pallet which occupies the operative position is reliably maintained at a predetermined level which is best suited for predictable treatment of one or more workpieces on the platform of such pallet. In addition, the pallets and the belt conveyors are subject to less wear, especially if the pallet occupying the operative position is to be maintained in such position for a relatively long interval of time. The pallet 5 of FIG. 1 is maintained in the operative position by the profiled portions of the idler rollers 45 to 48 and 50 to 53 as well as by the front stop 35 of the conveyor 17.

The distance 71 (FIG. 1) between the vertical axes of rotation of the transversely aligned idler rollers 48 and 53 (i.e., of the rearmost rollers which engage a pallet occupying the operative position) exceeds the distance 72 between the axes of the transversely aligned rollers 47, 52 or 46, 51 or 45, 50 by 0.05 mm to 0.3 mm, preferably by approximately 0.1 mm.

Figure 8:
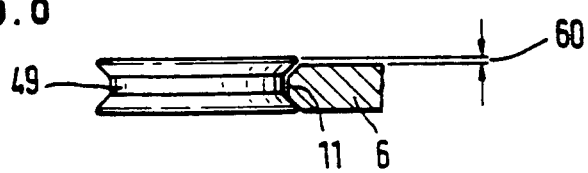
FIG. 8 is a similar enlarged transverse sectional view substantially as seen in the direction of arrows from the line VIII—VIII in FIG. 1.

As shown in FIG. 8, the width of the circumferential groove in the peripheral surface of the idler roller 49 (the same applies for the roller 54) exceeds the width of the circumferential grooves 44 of the other set of rollers (including the rollers 45 to 48 and 50 to 53). This ensures that the profiled portion of a sidewall (such as the sidewall 11 of the pallet 6 shown in FIG. 8) is received in the respective groove with a clearance 60. When the pallet 6 is about to advance between the idler rollers 49 and 54, the profiled portions of its sidewalls 10, 11 engage the lower conical surfaces in the circumferential grooves of the idler rollers 49, 54 to be thereupon lifted (by the distance 31) in order to become disengaged from the upper reaches of the belt conveyors 2 and 3. It is clear that the clearance 60 is selected with a view to permit gradual and smooth lifting of the pallet 6 when it is in the process of advancing from the position of readiness (shown in FIG. 1) toward the operative position (in which the profiled portions of its sidewalls 10, 11 are located forwardly of the idler rollers 49, 54 and are engaged solely by the idler rollers 45 to 48 and 50 to 53.

The initial stage of advancement of the pallet 6 from the position of readiness to the operative position involves a slight lifting (through the distance 31) of the pallet 6 by the profiled portions of the four idler rollers 48 and 53. At the same time, the rear portion of the platform of the pallet 6 continues to abut the upper reaches of the belt conveyors 2 and 3. The required clearance for such slightly tilted positioning of the platform of the pallet 6 is provided by the greater distance 71 between the axes of the rollers 48, 53 (as compared with the distance 72 between the axes of the rollers 47, 52 and 46, 51 and 45, 50). The platform of the pallet 6 is lifted above and away from the belt conveyors 2, 3 when the sidewalls 10, 11 advance into engagement with the surfaces bounding the grooves in the peripheral surfaces of the rollers 47 and 52. The clearance 60 (FIG. 8) renders it possible to achieve such stepwise lifting of the pallet 6 above and away from the belt conveyors 2 and 3.

As can be seen in FIGS. 1 and 2, the rollers 47 and 48 are immediately adjacent each other and the roller 48 is immediately adjacent the roller 49. Analogously, the rollers 52, 53 are immediately adjacent each other and the roller 53 is immediately adjacent the roller 54. This renders it possible to achieve the aforediscussed stepwise lifting of successive pallets above and away from frictional engagement with the upper reaches of the belt conveyors 2 and 3.

The aforediscussed lifting of successive pallets above and away from the belt conveyors 2 and 3 can be achieved even if the two rearmost idler rollers 49, 54 do not receive the profiled portions of adjacent sidewalls 8-9, 10-11, etc. with a certain amount of play (as shown at 60 in FIG. 8). All that is necessary is to mount the rollers 49, 54 on the respective shafts with a certain play corresponding to the clearance 60. This is shown in FIG. 10 wherein the roller 49 (the same applies for the roller 54) is movable up and down between two fixed stops 61, 62 through a distance which corresponds to the clearance 60. This enables a pallet which is in the process of advancing from the position of readiness to the operative position to be temporarily inclined forwardly and upwardly so that the leaders of the profiled portions of its sidewalls can enter the peripheral grooves of the rollers 48, 53 and thereupon the grooves in the peripheral surfaces of the rollers 47, 52 with resulting lifting of the rear portions of the platforms above and away from the upper reaches of the belt conveyors 2 and 3. The provision of axial play and of the stops 61, 62 renders it possible to employ rollers 49, 54 which are identical with the rollers 45 to 48 and 50 to 53.

It is further within the purview of the invention to replace the idler rollers 45 to 54 with non-rotatable guide elements in the form of wedges along which the profiled portions of sidewalls of the pallets slide during advancement of pallets from positions of readiness to operative positions. Thus, and referring for example, to FIG. 10, the upper third of the idler roller 49 can be replaced with a first fixed wedge on the frame or housing 19 and the lower third of the roller 49 of FIG. 10 can be replaced with a second fixed wedge which is part of or is secured to the frame or housing 19. Friction between such stationary wedge-like guide elements and the profiled portions of sidewalls of the pallets is more pronounced than if the guide means includes idler rollers.

Figure 11:
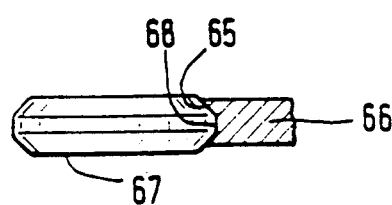
FIG. 11 is a view similar to that of FIG. 7 but showing still another idler roller and a portion of a sidewall of a pallet.

FIG. 11 shows that the positions of male and female profiled portions can be reversed, i.e., the sidewalls (one shown in FIG. 11, as at 66) can be provided with straight grooves 65 bounded by a pair of mutually inclined conical surfaces and one vertical bottom wall. The guide means then comprises substantially barrel-shaped idler rollers 67 each having a peripheral surface including two mutually inclined preferably mirror symmetrical conical portions and a top land 68 between the two conical portions. In all other respects, rollers of the type corresponding to the roller 67 of FIG. 11 cooperate with the adjacent profiled portions of sidewalls of the pallets in the same way as described for the rollers 45 to 54 and the profiled sidewalls 8 to 11.

Still further, rollers of the type shown at 67 in FIG. 11 can be replaced with slides which are fixedly secured to the frame 19, i.e., with guide elements which need not be rotatably mounted on their frame. The slides which replace the rearmost rollers (corresponding to the rollers 49, 54 of FIG. 1) are then received in the respective grooves 65 with a certain clearance (60).

The mode of operation of the apparatus which is shown in FIGS. 1 to 9 is as follows:

If the pallet 5 is to leave the operative position of FIG. 1 in order to be replaced with the pallet 6, the aforementioned control unit is caused to start the prime mover 20. This results in two revolutions of the rotor 17 before the cam 25 of the transmission 21-25 trips the device 26 to arrest the rotor 17 in the angular position of FIG. 1 or 2. This results in advancement of the pallet 5 beyond the operative position and in advancement of the pallet 6 to the operative position. The initial stage of movement of the pallet 6 from the position of readiness toward the operative position takes place while the roller follower 13 of the pallet 5 receives an impetus from the cam face 70 in the front recess 29 of the groove 16 so that the follower 13 leaves the recess 29 on its way toward renewed engagement with the upper reaches of the belt conveyor 2 and 3. This takes place while the roller follower 14 of the pallet 6 enters the first convolution 28 of the helical groove 16 in the peripheral surface of the conveyor 17. The surfaces bounding the convolutions 27, 28 of the groove 16 cause the pallet 6 to advance in the direction of arrow 4. The RPM of the output element of the prime mover 20 is selected in such a way that the speed of forward movement of the pallet 6 (as a result of rolling of the follower 14 along the surfaces flanking the groove 16) is much higher than the speed of forward movement of the belt conveyors 2 and 3. For example, the speed of the prime mover 20 can be selected in such a way that it takes approximately 0.4 second to advance the pallet 6 from the position of FIG. 1 to the operative position. The rapidly advancing pallet 6 pushes to preceding pallet 5 out of the operative position at a speed which can be several times (e.g., thirty times) the speed of the belt conveyors 2 and 3. The pallet 5 descends onto the upper reaches of the conveyors 2 and 3 as soon as its sidewalls 8 and 9 advance beyond the foremost idler rollers 45 and 50. Thereafter, the speed of the pallet 5 is determined by the continuously driven belt conveyors 2 and 3 which can advance at a speed of, for example, twelve seconds per length of a pallet.

The forward movement of the pallet 6 is interrupted as soon as the roller follower 14 reaches the front stop 35. At such time, the cam 25 engages the device 16 to thereby arrest the prime mover 20. The pallet 6 thereupon remains in the operative position for a fixed or desired interval of time, depending on the nature and the extent of treatment of one or more workpieces on the pallet.

The front portion of the pallet 7 enters the space between the rearmost idler rollers 49, 54 during or immediately following the last stage of movement of the preceding pallet 6 to the operative position. The roller follower of the pallet 7 enters the circumferentially extending recess 30 at the rear end of the rotor 17 and comes into abutment with the stop 36 to thus ensure that the position of the pallet 7 then corresponds to the position (of readiness) of the pallet 6 in FIG. 1. The pallet or pallets behind the pallet 7 (in the position of readiness of the pallet 7) are urged forwardly by the belt conveyors 2, 3 so that they form a file of continuous pallets immediately behind the pallet 7. The pallets which follow the pallet 7 begin to slide relative to the belt conveyors 2 and 3 as soon as the foremost pallet of the file behind the pallet 7 comes into abutment with the pallet 7.

The rollers 48, 53 lift the front portion of the pallet 6 off the conveyors 2, 3 during the initial stage of advancement of the pallet 6 toward the operative position. The rear portion of the pallet 6 is lifted off the conveyors 2, 3 as soon as the leading ends of profiles on its sidewalls 10, 11 enter the peripheral grooves of the idler rollers 47 and 52. The entire pallet 6 is lifted off the conveyors 2, 3 during further advancement toward the operative position which is reached when the roller follower 14 strikes the front stop 35 of the conveyor 17.

An important advantage of the apparatus 1 is that the speed at which a pallet is advanced by the rotor 17 exceeds (and can greatly exceed) the speed of the belt conveyors 2 and 3. This renders it possible to appreciably reduce the intervals of time which are required to move pallets from operative positions and to simultaneously move next-following pallets into the predetermined portion of their path, i.e., to operative positions.

Another important advantage of the improved apparatus is that each pallet which reaches the operative position is maintained in such position by a large number of stationary parts, namely by the idler rollers 45 to 48 and 50 to 53 as well as by the front stop 35 of the (then stationary) rotor 17. This renders it possible to maintain a pallet in the operative position with a high and unchanging degree of accuracy for any desired interval of time.

A further important advantage of the improved apparatus is that only a single part (rotor 17) must be set in motion in order to expel the foremost pallet from the operative position while simultaneously advancing the next-following pallet to the operative position. Furthermore, it is not necessary to provide separate stops for those pallets which are maintained in the operative positions and in the positions of readiness; the stops are provided on the rotor 17 and are effective in automatic response to advancement of two successive pallets to the operative position and to the position of readiness, respectively.

An additional important advantage of the improved apparatus is that the guide means (such as the idler rollers 45 to 54) can perform a number of desirable functions. Thus, the idler rollers control the direction of movement of successive pallets toward and beyond the operative positions. In addition, the idler rollers cooperate to lift successive pallets off the belt conveyors 2, 3 before such pallets reach the operative positions. Still further, the idler rollers cooperate with the stop 35 to maintain the foremost pallet in an accurately determined operative position in which the workpiece or workpieces on the foremost pallet are in optimum positions for removal of material and/or for any other treatment. The idler rollers need not be driven and, as mentioned above, such idler rollers can be replaced with non-rotatable guide elements without departing from the spirit of the invention.

An advantage of the first conveyor including the continuously driven belt conveyors 2 and 3 is that a pallet which has been advanced beyond the operative position is automatically entrained and advanced to the next processing station (e.g., to a loading station or to an inspecting station) as soon as it has been expelled from the predetermined portion of the path which is occupied by the pallet 5 of FIG. 1. The first conveyor including the belt conveyors 2 and 3 exhibits the additional advantage that it ensures the positioning of a pallet in a state of readiness as soon as the preceding pallet reaches the operative position. This contributes to higher output of the machine or production line in which the apparatus 1 is put to use. All in all, the first conveyor including the belt conveyors 2 and 3 contributes to an increase of frequency at which the pallets can be treated by one or more material removing and/or other tools while dwelling in the operative position.

The cam face 70 constitutes an optional but desirable and advantageous feature of the apparatus 1. This cam face ensures that the inertia of the pallet which assumes the operative position is overcome with little loss in time; all that is necessary is to start the prime mover 20 so that the rotor 17 is set in motion and the cam face 70 (which is suitably inclined) propels the foremost pallet in the direction of arrow 4 because such pallet is pushed by the next-following pallet the roller follower of which is confined in the first convolution 28 of the helical groove 16. The arrangement may be such that the cam face 70 abruptly accelerates the foremost pallet at least to the speed of the belt conveyors 2 and 3.

The apparatus can employ additional guide means to ensure adequate guidance of successive pallets toward the predetermined portion of their path. It has been found that, as a rule, the guiding action of the upper reaches of the belt conveyors 2, 3 suffices to ensure that successive pallets find their way into the space between the two rearmost idler rollers 49, 54 to be thereupon positively guided from below as well as at the sides on their way toward operative positions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for intermittently advancing successive objects of a series of objects, particularly pallets, which are provided with followers and include pairs of sidewalls having predetermined first profiles, comprising an endless first conveyor arranged to frictionally engage and entrain the objects of the series in a predetermined direction along a predetermined path which is flanked by the sidewalls of the entrained objects; an intermittently driven second conveyor including a rotor rotatable about an axis extending in said direction and having a peripheral surface provided with an open-ended helical follower-receiving groove, a first stop engageable by an oncoming object of the series and a second stop engageable by an object having a follower in said groove and occupying a predetermined portion of said path; guide means flanking said path and having second profiles substantially complementary to said first profiles, said guide means including idler rollers which are rotatable about axes extending substantially at right angles to the axis of said rotor and to said predetermined direction, said rollers including a first set of rollers which engage the sidewalls of an object upstream of said predetermined portion of said path while such object is engaged by said first conveyor, and a second set of roller which engage the sidewalls of an object in said predetermined portion of said path to maintain such object out of contact with said first conveyor; and means for intermittently rotating said rotor.

2. The apparatus of claim 1, wherein said first conveyor comprises a plurality of parallel endless conveyors.

3. The apparatus of claim 1, wherein said rotor has a front end and a rear end, as seen in said direction, said first stop being disposed at said rear end and said second stop being disposed at said front end.

4. The apparatus of claim 3, wherein one end of said groove constitutes a substantially circumferentially extending first recess which is disposed at said rear end and the other end of said groove constitutes a substantially circumferentially extending second recess which is disposed at said front end, said first stop flanking said first recess, said second stop flanking said second recess and each of said stops facing counter to said predetermined direction.

5. The apparatus of claim 4, wherein said stops are disposed transversely of said direction and extend circumferentially of said rotor through substantially identical angles.

6. The apparatus of claim 3, wherein said groove has a portion disposed at the front end of said rotor and configured to effect acceleration of the follower of an object in response to starting of said rotor.

7. The apparatus of claim 1, wherein said rotating means comprises a prime mover, a device which is operable to arrest said prime mover and means for operating said device including a transmission between said prime mover and said device.

8. The apparatus of claim 7, wherein said groove has n convolutions and said transmission has a ratio of 1:n.

9. The apparatus of claim 1, wherein the profiles of said second set of rollers are offset relative to the profiles of said first set of rollers in the axial direction of said rollers by a distance of 3.0 to 1 mm, preferably approximately 0.8 mm.

10. The apparatus of claim 9, wherein the profiles of said first set of rollers engage the profiles of the sidewalls between the rollers of said first set with an axial clearance which at least matches said distance.

11. The apparatus of claim 1, wherein the rollers of said first set are movable axially relative to the rollers of said second set.

12. The apparatus of claim 1, wherein the rollers of said second set include a pair of closely adjacent rollers at each side of said path and the rollers of said pairs are adjacent the front end of said rotor, as seen in said direction.

13. The apparatus of claim 1, wherein the rollers of said second set include a first group of rollers disposed at a first distance from each other —as seen transversely of said direction—and a second group of rollers disposed at a greater second distance from each other.

14. The apparatus of claim 13, wherein said second distance exceeds said first distance by 0.05 to 0.3 mm, preferably by approximately 0.1 mm.

15. The apparatus of claim 1, wherein one of said first and second profiles is a substantially roof-shaped profile.

16. Apparatus for intermittently advancing successive objects of a series of objects, particularly pallets, which are provided with followers and include pairs of sidewalls having predetermined first profiles, comprising an endless first conveyor arranged to frictionally engage and entrain the objects of the series in a predetermined direction along a predetermined path which is flanked by the sidewalls of the entrained objects; an intermittently driven second conveyor including a rotor rotatable about an axis extending in said direction and having a peripheral surface provided with an open-ended helical follower-receiving groove, a first stop engageable by an oncoming object of the series and a second stop engageable by an object having a follower in said groove and occupying a predetermined portion of said path; guide means flanking said path and having second profiles substantially complementary to said first profiles, said guide means including idler rollers which are rotatable about axes extending substantially at right angles to the axis of said rotor and to said predetermined direction, one of said first and second profiles being a substantially roof-shaped profile and said second profiles including surfaces bounding wedge-shaped circumferential grooves provided in said rollers; and means for intermittently rotating said rotor.

* * * * *